United States Patent [19]
Maly et al.

[11] 3,903,193
[45] Sept. 2, 1975

[54] DIMERIZATION AND CODIMERIZATION OF OLEFINS

[75] Inventors: Neil A. Maly, Tallmadge; Henry R. Menapace, Stow; Gerald S. Benner, Tallmadge, all of Ohio

[73] Assignee: The Goodyear Tire & Rubber Company, Akron, Ohio

[22] Filed: Aug. 12, 1974

[21] Appl. No.: 496,594

[52] U.S. Cl. .................... 260/683.15 D; 252/429 B
[51] Int. Cl.[2] ......................................... C07C 3/21
[58] Field of Search ........................... 260/683.15 D

[56] References Cited
UNITED STATES PATENTS
3,813,453  5/1974  Wideman .................. 260/683.15 D

*Primary Examiner*—Paul M. Coughlan, Jr.
*Attorney, Agent, or Firm*—F. W. Brunner; J. Y. Clowney

[57] ABSTRACT

There is disclosed an improvement in a process in which α-olefins containing from 3 to 10 carbon atoms are dimerized or codimerized by means of a catalyst comprising (A) at least one organometallic compound selected from the group consisting of $$R_nMX_{3-n}$$

where R is an alkyl radical containing from 1 through 10 carbon atoms, X is a halogen from the group of chlorine, bromine and iodine, $n$ is equal to 1, 1.5 or 2, and M is from the group of boron, aluminum, and gallium, and (B) the reaction product of (1) at least one tungsten salt selected from the group of tungsten hexachloride, tungsten pentabromide, tungsten oxytetrachloride and tungsten oxytetrabromide, and (2) at least one aromatic primary amine selected from the group of the formulae:

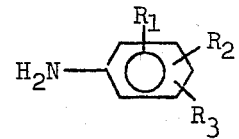

wherein $R_1$, $R_2$ and $R_3$ may be hydrogen or an alkyl radical containing from 1 through 6 carbon atoms and

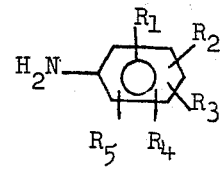

wherein $R_1$, $R_2$, and $R_3$ may be hydrogen or a halogen, $R_4$ is a halogen and $R_5$ may be hydrogen, a halogen or an alkyl radical containing from 1 through 6 carbon atoms, the improvement comprising reacting the tungsten halide and the aromatic primary amine at a temperature of at least 75°C in a suitable solvent.

4 Claims, No Drawings

DIMERIZATION AND CODIMERIZATION OF OLEFINS

This invention is directed to the dimerization of α-olefins. More specifically, it is directed to an improvement in a process for the dimerization and/or co-dimerization of α-olefins containing from 3 through 10 carbon atoms by means of a catalyst system comprising (A) an organometallic compound such as an alkyl metallic halide, and (B) the reaction product of (1) a tungsten halide and (2) a primary aromatic amine, the improvement being that the tungsten halide and the primary aromatic amine are reacted or preformed while being heated to a temperature of at least 75°C in a suitable solvent.

By the term dimerization is meant that 2 moles of an α-olefin are dimerized to form a new olefin, for instance, 2 moles of propylene are dimerized to produce 1 mole of hexane. By the term codimerization is meant that two dissimilar α-olefins are dimerized to form a new olefin, for instance, 1 mole of propylene is codimerized with 1 of 1-butene to form 1 mole of heptene.

The α-olefins which are dimerized or codimerized in accordance with this invention are olefins containing from 3 to 10 carbon atoms inclusive and may be straight or branched chain olefins. Representative of such olefins are propylene, 1-butene, isobutene, 1-heptene, 1-hexene, 2-methyl-1-butene, 2-ethyl-1-butene, 1-octene, 1-decene, and other branched or straight chain α-olefins containing at least 3 and not more than 10 carbon atoms.

Accordingly, the invention is one in which α-olefins containing 3 to 10 carbon atoms inclusive are dimerized or codimerized by means of a catalyst comprising (A) at least one organometallic compound selected from the group consisting of $$R_nMX_{3-n}$$

where R is an alkyl radical containing from 1 through 10 carbon atoms, X is a halogen from the group of chlorine, bromine, and iodine, $n$ is equal to 1, 1.5 or 2, and M is from the group of boron, aluminum, and gallium, and (B) the reaction product of (1) at least one tungsten salt selected from the group of tungsten hexachloride, tungsten pentabromide, tungsten oxytetrachloride and tungsten oxytetrabromide, and (2) at least one aromatic primary amine selected from the group of the formulae:

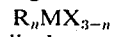

wherein $R_1$, $R_2$ and $R_3$ may be hydrogen or an alkyl radical containing from 1 through 6 carbon atoms and

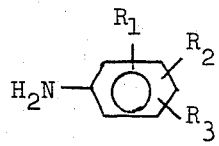

wherein $R_1$, $R_2$ and $R_3$ may be hydrogen or a halogen, $R_4$ is a halogen and $R_5$ may be hydrogen, a halogen or an alkyl radical containing from 1 through 6 carbon atoms, the improvement comprising reacting the tungsten halide and the aromatic primary amine while being heated to a temperature of at least 75°C in a suitable solvent.

In the practice of this invention, the dimerization or codimerization may be conducted in a batch or continuous manner, in the temperature range from about 20° to 100°C, with 30° to 80°C being more preferred.

The residence time of the dimerization or codimerization employed may vary from about 1 minute to 3 hours with 5 minutes to 1.5 hours being more preferred.

The pressure of the dimerization or codimerization process may vary from about 0 to about 1,000 pounds per square inch gauge, depending in part on the particular olefins and temperatures employed.

For best results, the dimerization or codimerization process should be carried out under anhydrous conditions.

In the practice of the process of this invention, inert diluents may be employed as heat transfer agents, to solubilize the components of the dimerization mixture, and the like. Representative of such inert diluents are aromatics such as benzene, chlorobenzene or dichlorobenzene and paraffins such as propane, pentane, hexane, and octane. However, aromatic solvents such as benzene and chlorobenzene are preferred.

The first catalyst component is an organometallic compound responding to the formula $R_nMX_{3-n}$, where $n$ is 1, 1.5, or 2, R is an alkyl radical containing 1 through 10 carbon atoms, X is a halogen such as chlorine, bromine, or iodine, and M is a metal from the group of boron, aluminum, and gallium. Representative of such compounds are ethylaluminum dichloride, diisobutylaluminum bromide, diethylaluminum chloride, ethylaluminum sesquichloride, ethylaluminum dibromide, ethylaluminum sesquibromide and similar compounds where boron or gallium is present instead of aluminum. Of these, ethylaluminum dichloride and ethylaluminum sesquichloride are preferred.

The second component of the catalyst system of this invention is the reaction product of (1) at least one tungsten compound selected from the group of tungsten hexachloride, tungsten pentabromide, tungsten oxytetrachloride, and tungsten oxytetrabromide, and (2) at least one primary aromatic amine of the formulae:

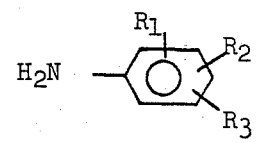

wherein $R_1$, $R_2$ and $R_3$ may be hydrogen or an alkyl radical containing from 1 through 6 carbon atoms and

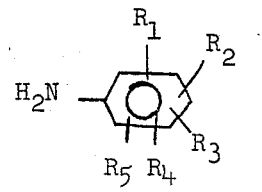

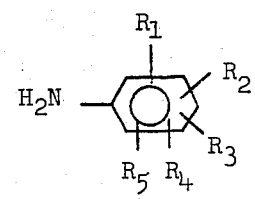

wherein $R_1$, $R_2$ and $R_3$ may be hydrogen or a halogen, $R_4$ is a halogen and $R_5$ may be hydrogen, a halogen or an alkyl radical containing 1 through 6 carbon atoms.

Representative of such amines are aniline, 4-chloroaniline, 4-fluoroaniline, 2,6-dichloroaniline, 2,4,6-trichloroaniline, 2,4-difluoroaniline, pentachloroaniline, 2,6-dichloro-4-bromoaniline, 4-methylaniline, 2,4,6-trimethylaniline, 2,6-dibromo-4-chloroaniline, 2,4,5-trichloroaniline, 2,6-dichloro-4-iodoaniline, 2,6-dimethylaniline, and the like. The preferred amines are aniline and 2,4,6-trichloroaniline.

These reactions between tungsten halides and primary amines to form tungsten-amine derivatives are best carried out by adding a solution of the amine under nitrogen to a heated or refluxing solution of the tungsten halide in a suitable solvent. The molar ratio of amine to tungsten should vary from 0.5/1 to 2.5/1, with 1/1 to 2/1 being preferred. Solvents suitable for this reaction are aromatic hydrocarbons or halogenated aromatic hydrocarbons represented by benzene, chlorobenzene and 1,2-dichlorobenzene.

As has been indicated, the thrust of the present invention is the reaction of the tungsten halides and the aromatic primary amines at a temperature of at least about 75°C prior to the addition of the organometallic component of the catalyst. It has been found that a much more active catalyst is obtained if this pre-reaction is made at elevated temperatures, for instance, 75° or 80°C, the reflux temperature of benzene or even higher temperatures. Temperatures above about 200°C do not provide any additional improvement to warrant their use. The time for this pre-reaction step of the tungsten compound and the aromatic primary amine has not been found to be critical. A procedure which has been found convenient is one where the tungsten halide is dissolved in an aromatic solvent such as benzene or chlorobenzene and brought to reflux and then the amine added. The time the two components are reacted does not seem critical, any time from 0 to 60 minutes will provide an improvement. Times from 2 to 30 minutes are preferred and 5 to 15 minutes more preferred.

The molar relationship between the catalyst components employed in this invention may vary widely. For instance, the molar relationship of the organometallic component (A) to the tungsten-amine derivative (B) may vary from about 5/1 to about 100/1, with 10/1 to 30/1 being preferred.

The amount of catalyst used in the process of dimerization or codimerization is not critical so long as a catalytic amount is employed. As much as 134,000 moles of propylene per mole of tungsten have been charged to an autoclave with conversions of 26 percent (34,800 moles converted per mole of tungsten). The amount employed will depend on factors such as the rate desired, the temperature and pressure employed and the like. Persons skilled in the art will readily be able to determine the proper amounts of catalysts and reactants.

The order of combining the catalyst components (A) and (B) and the olefin may vary according to the circumstances or desires of the experimenters.

The practice of this invention may be further illustrated by reference to the following examples which are intended to be representative rather than restrictive of the scope of the invention.

EXAMPLES I – VII

In these examples, the tungsten hexachloride and the particular aromatic primary amine employed were prereacted. In Examples II, IV, V and VII, which represent the practice of the improvement of the present invention, the tungsten hexachloride and the particular amine were prereacted at 132°C, the reflux temperature of chlorobenzene, as follows.

In 50 ml of chlorobenzene under nitrogen there was added 1 gram of $WCl_6$. This mixture was then brought to the refluxing temperature of chlorobenzene, which is 132°C. To this refluxing mixture was added 2 moles per mole of tungsten of the particular amine therein employed. The reflux was continued for a period of 10 minutes at which time the solution was cooled to room temperature, filtered and assayed for the tungsten content.

In Examples I, III and VI, which are comparative examples and represent the prior art, the tungsten hexachloride and the particular amine were prereacted at room temperature in the same manner as in Examples II, IV, V and VII except the mixing was done at room temperature and the solution was not heated to 132°C.

In Examples I, IV, VI and VII, 102 grams (2.4 moles) of propylene were charged into a 300 ml stainless steel stirred reactor and heated to 60°C. The catalyst components comprising the tungsten hexachloride-amine derivative and ethylaluminum dichloride were mixed together in a stainless steel vessel and then charged into the reactor. The mole ratio of the catalyst to the tungsten to the amine to the aluminum compounds were 48,000/1/2/30. The dimerizations were carried out for 1 hour at 60°C at which time the reaction was terminated by quenching with water. A small representative sample was analyzed by vapor phase chromatography to determine the results of the dimerizations.

Example V illustrates the use of a continuous reactor into which 9,775 moles of propylene per mole of tungsten per hour were charged utilizing a catalyst wherein the mole ratio of aluminum to tungsten was 15/1.

The results of Examples I–VII are given in Table 1 below in which column 1 is the Example number, column 2 is the particular amine employed, column 3 is the percent conversion, column 4 is the conversion in moles of propylene per mole of tungsten per hour and column 5 is the percent selectivity to $C_6$ olefins.

TABLE I

| Example | Amine | % Conv | Conv Moles $C_3H_6$/ W/hr | % Select $C_6$'s |
|---|---|---|---|---|
| I | Aniline | 2.2 | 1,070 | 60 |
| II | Aniline | 39. | 18,900 | 98 |
| III | 2,4,6-trichloro-aniline | 14. | 6,600 | 95 |

TABLE I—Continued

| Example | Amine | % Conv | Conv Moles C₃H₆/W/hr | % Select C₆'s |
|---|---|---|---|---|
| IV | 2,4,6-trichloro-aniline | 43 | 21,100 | 98 |
| V | 2,4,6-trichloro-aniline | 74 | 7,264 | 95 |
| VI | 2,4,6-tribromo-aniline | 7.8 | 3,900 | 97 |
| VII | 2,4,6-tribromo-aniline | 17 | 8,300 | 98 |

A comparison between Examples I and II will illustrate the effectiveness of utilizing the refluxing temperature of chlorobenzene, 132°C, to react catalyst components tungsten halide and the primary aromatic amine. Particularly note the greater activity of the catalyst in converting much more propylene per mole of catalyst. A like improvement can be noticed by comparison of Examples III and IV and also Examples VI and VII.

These data indicate that when the catalyst components such as the amine and the tungsten halide are mixed together at a temperature of at least 75°C prior to the reaction with the organoaluminum compound the catalyst is much more effective, particularly in moles of propylene converted per mole of tungsten per hour.

EXAMPLES VIII and IX

In these experiments which were conducted in a manner similar to that I–IV and VI and VII except that tungsten pentabromide was employed instead of tungsten hexachloride and the mole ratio of reactants was propylene/tungsten/amine/aluminum of 24,000/1/2/30. In Example VIII the tungsten pentabromide and amine was prereacted at room temperature and in Example IX they were refluxed in chlorobenzene at 132°C. The results are listed in Table 2 with the columns the same as in Table 1.

TABLE 2

| Example | Amine | % Conv | Conv Moles C₃H₆/W/hr | % Select, C₆'s |
|---|---|---|---|---|
| VIII | 2,4,6-trichloro-aniline | 5.3 | 1,300 | 98 |
| IX | 2,4,6-trichloro-aniline | 39 | 9,800 | 99 |

Again a much more active catalyst is produced by mixing the amine and tungsten halide at elevated temperatures rather than at room temperature.

EXAMPLES X – XIV

In these experiments, the catalyst was prepared in a manner similar to Examples II, IV, VII and IX, that is, the tungsten hexachloride and the 2,4,6-trichloroaniline were prereacted at the refluxing temperature of chlorobenzene, 132°C. Examples X through XIV illustrate the varying ratios of the amine to the tungsten. The results are given in Table 3 below wherein columns, 1, 3, 4 and 5 represent the same as in Table 1. Column 2 is the amine/WCl₆ mole ratio.

TABLE 3

| Example | Amine/WCl₆ Ratio | % Conv | Conv Moles C₃H₆/W/hr | % Select C₆'s |
|---|---|---|---|---|
| X | 0.8 | 34 | 16,900 | 97 |
| XI | 1.0 | 42 | 20,900 | 96 |
| XII | 1.6 | 44 | 15,200 | 96 |
| XIII | 2.0 | 40 | 20,000 | 97 |
| XIV | 2.5 | 35 | 17,300 | 96 |

EXAMPLE XV

In this example, which was conducted in a manner similar to that of Example II, except that the α-olefin employed was 1-octene, the mole ratio of the 1-octene/tungsten/aniline/aluminum was 6,240/1/2/20. The conversion was 68 percent or 4,240 moles of octene converted per mole of tungsten per hour. The selectivity to hexadecenes was almost 100 percent.

Thus, the invention is an improvement in the process for the dimerization or codimerization of α-olefins containing from 3 to 10 carbon atoms by means of a catalyst comprising (A) an organometallic compound such as ethylaluminum dichloride, diethyl aluminum chloride, ethylaluminum sesquibromide, ethylaluminum sesquichloride and the corresponding boron and gallium compounds and (B) the reaction product of a tungsten halide such as tungsten hexachloride, tungsten pentabromide, tungsten oxytetrachloride and tungsten oxytetrabromide and an aromatic primary amine such as aniline, chloroaniline, dichloroaniline, trichloroaniline, 4-methylaniline, pentachloroaniline, and the like wherein the tungsten halide and the primary aromatic amine are reacted prior to contact with the organometallic compound at a temperature of at least 75°C for a short period of time. The invention likewise is one of preparing such a catalyst and is also directed to the catalyst itself prepared in this manner.

While certain representative embodiments and details have been shown for the purpose of illustrating the invention, it will be apparent to those having skill in this art that various modifications and changes may be made therein without departing from the spirit or scope of the invention.

What is claimed is:

1. In a process in which α-olefins containing from 3 to 10 carbon atoms are dimerized or codimerized by means of a catalyst comprising (A) at least one organometallic compound selected from the group consisting of $$R_nMX_{3-n}$$ 

where R is an alkyl radical containing from 1 through 10 carbon atoms, X is a halogen from the group of chlorine, bromine and iodine, n is equal to 1, 1.5 or 2, and M is from the group of boron, aluminum, and gallium, and (B) the reaction product of (1) at least one tungsten halide selected from the group of tungsten hexachloride, tungsten pentabromide, tungsten oxytetrachloride and tungsten oxytetrabromide, and (2) aniline, in which the molar relationship between the aniline and the tungsten halides vary from a molar ratio of from 0.5/1 to 2.5/1 and in which the molar relationship between the organometallic compound and the tungsten halide-aniline reaction product varies from about 5/1 to about 100/1, the improvement comprising reacting the tungsten halide and the aniline at a temperature of at least 75°C in a suitable solvent prior to the addition of the organometallic component.

2. The process according to claim 1 in which the $\alpha$-olefin is propylene.

3. The process according to claim 1 in which the organometallic compound selected from the group of ethylaluminum dichloride, diethyl aluminum chloride and ethylaluminum sesquichloride.

4. The method according to claim 1 in which the tungsten salt is selected from the group of tungsten hexachloride and tungsten pentabromide.

* * * * *

UNITED STATES PATENT OFFICE
CERTIFICATE OF CORRECTION

PATENT NO. : 3,903,193
DATED : September 2, 1975
INVENTOR(S) : Neil A. Maly, Henry R. Menapace & Gerald S. Benner It is certified that error appears in the above-identified patent and that said Letters Patent are hereby corrected as shown below:

Column 1, line 19, "hexane" should read "hexene".

Column 1, line 22, should read as follows:

"erized with 1 mole of 1-butene to form 1 mole of heptene."

Signed and Sealed this

Twelfth Day of October 1976

[SEAL]

Attest:

RUTH C. MASON
Attesting Officer

C. MARSHALL DANN
Commissioner of Patents and Trademarks